United States Patent Office 3,479,297
Patented Nov. 18, 1969

3,479,297
ROOM DEODORANTS
Horst Rutzen, Dusseldorf-Holthausen, and Albert Lowenstein, Dusseldorf, Germany, assignors to Bohme Fettchemie G.m.b.H., Dusseldorf-Holthausen, Germany
No Drawing. Continuation-in-part of application Ser. No. 387,775, Aug. 5, 1964. This application July 14, 1966, Ser. No. 565,099
Claims priority, application Germany, Aug. 8, 1963, B 73,038
Int. Cl. C09k 3/30; A61k 9/00; C07d 13/00
U.S. Cl. 252—305                              3 Claims

ABSTRACT OF THE DISCLOSURE

A room deodorant consisting of 60% to 80% by weight propellant, 20% to 40% by weight solvent, and ½% to 5% by weight active ingredient. The active ingredient is a cyclic acetal or ketal of a monounsaturated aldehyde or ketone having at least 3 carbon atoms and an aliphatic alcohol. The aliphatic alcohol is a 1,2-diol or 1,3-diol having 8 to 24 carbon atoms. The deodorant is maintained under pressure in a suitable container.

---

This application is a continuation-in-part of our copending application Ser. No. 387,775, filed Aug. 5, 1964, now abandoned.

The invention relates to room deodorants and, more particularly, to such deodorants which are based on certain cyclic acetals and ketals which will be more specifically identified hereinbelow.

Certain cyclic acetals have previously been employed as air purifiers but have been found deficient. For instance, Australian Patent 132,388 discloses the use of acetals. However, these compounds consist of short-chain molecules, which not only tend toward polymerization upon extended storage but, furthermore, can have a strongly irritating effect on human mucous membranes, while some of them do not exhibit any appreciable deodorizing effect.

In contradistinction, it has been found that those cyclic acetals and ketals are eminently suited as the active components in agents for purifying, sweetening and generally improving the air in enclosed rooms, which are obtained from mono- or polyunsaturated aldehydes or ketones having at least 3 carbon atoms in their molecules with higher-molecular 1,2- or 1,3-diols having 8 to 24 carbon atoms, and preferably 10 to 20 carbon atoms, in their molecules. These compounds are essentially odorless themselves but react within short periods of time with odiferous substances present in a room to form complexes neutral in odor. On the other hand, these compounds are sufficiently stable to retain their effectiveness over a comparatively long period of time.

The manufacture of the cyclic acetals may be accomplished, e.g., according to the directions given for the production of corresponding acetals from unsaturated aldehydes and low-molecular diols by R. F. Fischer and C. W. Smith (Journal of Organic Chemistry 25 (1960), 319–324), or in an analogous manner.

For the reaction leading to the production of the substances according to the present invention, particularly suited starting compounds are unsaturated aldehydes or ketones having 3 or more carbon atoms, such as acrolein, crotonaldehyde, tetrahydrobenzaldehyde; higher unsaturated aldehydes, methylheptenone, cyclohexenone, and similar compounds. Suitable diols are obtained from olefins, for instance by the hydroxylation with $H_2O_2$ in the presence of formic or acetic acid and saponification of the esters thus obtained; by the influence of hypochlorous acid (HClO), formation of the corresponding chlorohydrins and their saponification; furthermore by the direct oxidation of the olefins with atmospheric oxygen according to German Patent 734,838; or also by the hydrolysis of olefin oxides or by the Prins reaction. The aldehydes or ketones, respectively, as well as the diols may be branched in the carbon chain.

Examples for suitable acetals are the acrolein-, crotonaldehyde- or tetrahydrobenzaldehyde acetals of decanediol-1,2; dodecanediol-1,2; tetradecanediol-1,2; and the cyclohexenone-ketal of pentadecanediol-1,3, and fatty acid glycerol esteracetals of aldehydes as named above.

These products are obtained, e.g., by boiling the diol with an excess over molar quantities of the aldehyde or ketone in the presence of an acid catalyst and entrainment of the water of reaction in benzene or a similar solvent, e.g., by azeotropic distillation, neutralizing the acid catalyst and refining of the acetal thus obtained by distillation.

The application of the acetals for the deodorization of rooms is carried out by spraying the compounds, dissolved in amounts ranging from substantially 0.5 to 5 percent by weight in solvents such as ethanol, isopropanol, odorless petroleum distillation fractions, halogenated hydrocarbons or the like, by means of suitable spraying devices, for instance, an atomizer, about the room. Preferably the application is accomplished in such a manner that the acetals, dissolved in organic solvents, are sprayed by means of gaseous propellents, such as fluorinated and/or chlorinated hydrocarbons, propane, butane, or the like, from pressure containers, such as aerosol cans. By the choice of suitably constructed valves and of the relationship of solvent to propellent, the particle size of the spray can so be set that the cyclic acetals have maximum effectiveness.

The cyclic acetals are eminently effective against common household odors, appearing in kitchens, living rooms, baths and toilets. Tobacco odors and odors found in commercially used rooms are readily neutralized.

The invention now will be further explained by the following examples. However, it should be understood that these are given merely by way of illustration, and not of limitation, and that numerous changes may be made in the details without departing from the spirit and the scope of the invention as hereinafter claimed.

EXAMPLES

In an enclosed room having an area of 40 m.³, different odors were created, such as cooking of vegetables, fish, onions, burnt milk, overheated ("boiling") fat, cigar and cigarette smoke. After removal of the sources of the odors, the room each time was sprayed for 10 seconds with the mixtures named below which had been packed in aerosol cans (all parts named are by weight):

|  | Parts |
|---|---|
| (1) Decane-1,2-diol-acroleinacetal | 3 |
| Isopropanol | 20 |
| Mixture of monofluorotrichloromethane and difluorodichloromethane (equal parts by weight) | 77 |
| (2) Hexadecane-1,2-diol-crotonaldeacetal | 3 |
| Ethanol | 15 |
| Kerosene (or mineral spirits (b.r. 300–400° F.), or VM+P naphtha) | 7 |
| Mixture of monofluorotrichloromethane and difluorodichloromethane (equal parts) | 75 |
| (3) Dodecane-1,2-diol crotonaldehydeacetal | 2 |
| Ethanol | 20 |
| Mixture of monofluorotrichloromethane and difluorodichloromethane (equal parts) | 78 |
| (4) Pentadecane-1,3-diol-cyclohexenoneketal | 2.5 |
| Ethanol | 37.5 |
| Propane-butane mixture (25:75) | 60.0 |

| | Parts |
|---|---|
| (5) Eikosane-1,2-diol-acroleinacetal | 2.5 |
| Isopropanol | 20.0 |
| Mixture of monofluoromethane and difluorodichloromethane (equal parts) | 77.5 |
| (6) Hexadecane-1,2-diol-crotonaldehydeacetal | 1.0 |
| Methylenechloride | 25.0 |
| Mixture of monofluorotrichloromethane and difluorodichloromethane (10:90) | 74.0 |
| (7) Pentadecane-1,3-diol-cyclohexenoneketal | 5.0 |
| Methylenechloride | 10.0 |
| Isopropanol | 25.0 |
| Mixture of monofluorotrichloromethane and difluorodichloromethane (equal parts) | 60.0 |
| (8) Coconut fatty acid-glycerol-monoesteracrolein acetal (coconut fatty acids $C_{12}$–$C_{18}$) | 2 |
| Ethanol | 20 |
| Monofluorotrichloromethane and difluorodichloromethane (50:50) | 78 |

The acetals of unsaturated aldehydes, e.g., acrolein, crotonaldehyde, and the like, with long-chain 1,2-diols were produced, in a manner analogous to the method of Fischer and Smith (l.c.), in the following manner:

One mol of the 1,2-diol, 1.8 mols of the unsaturated aldehyde (or ketone, respectively), 500 ml. benzene and 50 mg. p-toluenesulfonic acid (the latter as catalyst) were boiled azeotropically with agitation until no more water was entrained. The acid catalyst then was neutralized with an excess CaO, and the solution filtered. After distillation of the excess of aldehyde and benzene, the residue was twice distilled at high vacuum. The yield was 70–82 percent.

Cyclic acetals of glycerol radicals with unsaturated aldehydes (or ketones, respectively) were obtained by the following two-step method:

1st step: 3 mols glycerol, 3 mols of the unsaturated aldehyde, 500 ml. benzene and 2 ml. 85% phosphoric acid were refluxed with strong agitation for 9 hours, until approximately 54 ml. water were removed. The solvent then was vacuum-distilled using a water ejection pump, without prior neutralization. The residue then was distilled at 12 torr. The yield was approximately 80 percent of theory.

2nd step: 1 mol of the glycerol acetal obtained in step 1 was refluxed with 1.3–1.8 mols fatty acid methylester and 2–4 ml. sodium methylate solution in methanol under water ejection pump vacuum, and the methanol formed collected together with a little distilling ester in a receiver held at −78° C. After all methanol had distilled, the excess fatty acid methylester first was distilled, using a water ejection pump or an oil pump depending upon the chain length of the fatty acid methylester used, followed by the distillation of the desired acetal. The yield was 80–91 percent of theory.

The effect of these deodorants was tested after a three-minute time interval by a group of persons which had been uninformed of the character of the odors. The average test results are found in Table 1 below. The numerical values correspond to the percentage of the total of persons involved. The number of persons participating in the test was 10.

TABLE 1

| Odor producer | Odor not noticeable | Odor not identifiable | Odor identified correctly |
|---|---|---|---|
| Tobacco smoke | 100 | 0 | 0 |
| Burnt milk | 60 | 40 | 0 |
| Overheated fat | 80 | 10 | 10 |
| Fried fish | 70 | 20 | 10 |
| Onions | 70 | 30 | 0 |

The reactivity of all seven compositions tested was practically the same.

For comparison, deodorants were prepared containing compounds as named in the Australian Patent 132,388, i.e., acrolein, acetaldehyde, methanol-formaldehyde acetal, ethanolacetaldehyde acetal, and a cyclic acetal of ethyleneglycol and acetaldehyde. These aerosol sprays had the following composition:

| | Parts |
|---|---|
| (9) Acrolein or acetaldehyde | 0.25 |
| Mineral spirits (boiling range 300–400° F.) | 19.75 |
| Monofluorotrichloromethane and difluorodichloromethane (50:50) | 80.0 |
| (10) One of the acetals named above | 2 |
| Ethanol | 18 |
| Propellant (as in 9 above) | 80 |

These materials were tested in a similar manner as the deodorants 1–8, by spraying a closed room of approximately 20 m.³ for 10 seconds. Five persons then tested for odors. The test odors were tobacco smoke, burnt milk and overheated fat. The results were as follows:

(9) acrolein and acetaldehyde so affected the mucous membranes of the personnel that they had to leave the test room immediately.

(10) methanol-formaldehyde acetal and ethyleneglycolacetaldehyde acetal displayed a rather pleasant odor of their own and did not affect the mucous membranes. However, the odors to be removed persisted. Ethanol-acetaldehyde acetal acted in the same manner but itself had a musty and disagreeable odor.

We claim as our invention:

1. A room deodorant consisting essentially of 60–80 weight percent of an aerosol propellant; 20–40 weight percent of a solvent selected from the group consisting of ethanol, isopropanol, methylene chloride, petroleum hydrocarbon fractions, and mixtures thereof; and of 0.5 to 5 weight percent of an active ingredient selected from the group consisting of a cyclic acetal or ketal of substances selected from the group consisting of monounsaturated aldehydes and ketones having at least 3 carbon atoms in their molecules and aliphatic alcohols selected from the group consisting of 1,2- and 1,3-diols having 8 to 24 carbon atoms in their molecules, said room deodorant being maintained under pressure in a container.

2. The room deodorant as defined in claim 1, wherein said aerosol propellant is selected from the group consisting of monofluoromethane and monofluorotrichloromethane plus difluorodichloromethane in mixtures ranging from 1:1 to 1:9; butane; propane; and mixtures thereof.

3. The room deodorant as defined in claim 1, wherein said 1,2- and 1,3-diols are selected from the group consisting of decane- and eikosane diols and $C_{12}$–$C_{18}$ fatty acids monoglycerides.

References Cited

UNITED STATES PATENTS 2,719,129  9/1955  Richardson _____ 252—305

FOREIGN PATENTS 132,388  5/1949  Australia.

U.S. Cl. X.R.

21—55; 260—340.7, 340.9; 424—45, 47, 65